US005174554A

United States Patent [19]

Yonezawa

[11] Patent Number: 5,174,554

[45] Date of Patent: Dec. 29, 1992

[54] CLAMPING APPARATUS

[75] Inventor: Keitaro Yonezawa, Kobe, Japan

[73] Assignee: Kabushiki Kaisha KOSMEK, Hyogo, Japan

[21] Appl. No.: 897,094

[22] Filed: Jun. 11, 1992

[30] Foreign Application Priority Data

Jun. 14, 1991 [JP] Japan ................................ 3-170540

[51] Int. Cl.[5] ........................................ B23Q 3/08

[52] U.S. Cl. .................................. 269/24; 269/137

[58] Field of Search .................... 269/24, 25, 32, 137, 269/134

[56] References Cited

U.S. PATENT DOCUMENTS 4,365,792 12/1982 Johns .
4,508,871 3/1985 Yonezawa .
4,932,640 6/1990 Shirakawa .
5,071,109 12/1991 Yonezawa .

FOREIGN PATENT DOCUMENTS 57-160838 10/1982 Japan .

*Primary Examiner*—Robert C. Watson
*Attorney, Agent, or Firm*—Bacon & Thomas

[57] ABSTRACT

A first piston (11) is inserted into a second piston (12) within a housing (4). An acting point portion (A), a fulcrum portion (C) and a wedge type pressure receiving surface (B) are provided in the first piston (11) in order from front side. A first swing gap (37) and a second swing gap (38) are provided in a space below the front portion of the first piston (11) and in a space above the rear portion thereof respectively. The second piston (12) is provided with a pushing surface (F) facing the pressure receiving surface (B) from below. At the time of clamping, by a fluid pressure within a first actuation chamber (21) both the pistons (11) (12) are advanced and after that the second piston (12) is advanced relative to the first piston (11). Thereupon, the acting point portion (A) is swung downwardly about the fulcrum portion (C).

6 Claims, 10 Drawing Sheets

CLAMPING APPARATUS

BACKGROUND OF THE INVENTION

1. Field of the Invention

The present invention relates to a clamping apparatus adapted to clamp an object to be clamped or fixed (referred to as a fixed object hereinafter) such as a metal mould, a work pallet, a work piece and the like onto a fixed angular table of a processing machine such as an injection moulding machine, a machining center and so on by means of a fluid pressure such as a pressurized air, a pressurized oil and the like, and more specifically to a technology intended to obtain a strong clamping force by use of a wedge type force increasing mechanism.

2. Description of the Related Arts

Such a clamping apparatus provided with the wedge type force increasing mechanism is described in U.S. Pat. No. 4,365,792. This clamping apparatus having a conventional construction operates as follows.

Firstly, when a piston is advanced a distance of an extension stroke, a clamping member is advanced from a retracted position to an extended position. Then, when the piston is advanced a distance of a temporary clamping stroke, a wedge member is advanced relative to the clamping member at the extended position. Thereupon, the clamping member is swung by the wedge member from the extended position to a temporary clamping position so as to be brought into contact with a metal mould (referred to as merely as a mould hereinafter). Subsequently, when the piston is further advanced a distance of a practical clamping stroke, the clamping member is strongly swung for clamping by a wedgewise engaging force of the wedge member from the temporary clamping position to a practical clamping position.

There are, however, the following problems associated with the above-mentioned conventional construction.

It is necessary for the clamping apparatus to have the temporary clamping stroke between the extension stroke and the practical clamping stroke. Since the swinging of the clamping member to the temporary clamping position is effected by the tapered wedge member, a comparatively long stroke is required for that temporary clamping stroke. Therefore, the entire stroke of the clamping apparatus becomes long. Consequently, a length of a housing in the forward and backward direction becomes large, so that the clamping apparatus becomes large in size.

Further, since the entire stroke of the clamping apparatus is long, also a clamping operation time becomes long and an efficiency of the clamping working is diminished.

SUMMARY OF THE INVENTION

It is a first object of the present invention to downsize a clamping apparatus. It is a second object of the present invention to shorten a clamping operation time.

For accomplishing the above-mentioned objects, a clamping apparatus of the present invention is constructed as follows.

A first piston for temporary clamping and a second piston for practical clamping are disposed within a housing so as to be movable in the forward and backward directions in a fluid tight relationship. After both the pistons have been advanced by a fluid pressure within a first actuation chamber formed behind both those pistons, the second piston is adapted to be further advanced relative to the first piston. To the contrary, the first piston is adapted to be retracted through the second piston by a fluid pressure within a second actuation chamber for unclamping formed in front of the second piston. The first piston is provided with an acting point portion, a fulcrum portion and a wedge type pressure receiving surface in order from front side. An unclamping actuated portion is disposed in the rear portion of the first piston so as to face forwardly. The second piston is provided with a wedge type pushing surface facing the wedge type pressure receiving surface from below and an unclamping actuating portion facing the actuated portion from front side. A first swing gap is provided in a space below the front portion of the first piston, and a second swing gap is provided in a space above the rear portion of the first piston.

The present invention functions as follows.

When changing over from the unclamping condition to the practical clamping condition through the temporary clamping condition, a pressurized fluid is supplied to the first actuation chamber. Thereupon, both the pistons are advanced forwardly a distance of an extension stroke by the fluid pressure, so that the acting point portion of the first piston is brought into contact with a fixed object such as a mould directly or indirectly from above so that the fixed object can be clamped temporarily.

Subsequently, the second piston is further advanced a distance of a practical clamping stroke relative to the first piston prevented from advancing so that the pushing surface of the second piston can engage with the pressure receiving surface of the first piston. Thereupon, by a wedgewise engaging force acting from the pushing surface to the pressure receiving surface, the pressure receiving surface is swung a little upwards about the fulcrum portion and the acting point portion is swung a little downwards thereabout. In this case, a force acting from the pushing surface to the pressure receiving surface is increased corresponding to a leverage and that increased clamping force is transmitted from the acting point portion to the fixed object.

Under the practical clamping condition, when the fluid pressure within the first actuation chamber is abnormally decreased or vanished by any accident, an unclamping force such as a gravitational force and a processing reaction force acting on the fixed object acts so as to cancel the clamping condition of the first piston. But, a friction force acts on the fulcrum portion from a cylinder bore of the housing and another friction force acts on the outer peripheral surface of the second piston from another cylinder bore so as to counteract that unclamping force, so that a resultant force of these two friction forces serves to prevent a retraction of the first piston. Moreover, when the first piston starts to retract even a little, the pressure receiving surface of the first piston bites onto the pushing surface of the second piston, so that the retraction of the first piston can be prevented.

When changing over from the practical clamping condition to the unclamping condition, the pressurized fluid is discharged from the first actuation chamber and the pressurized fluid is supplied to the second actuation chamber. Thereupon, the second piston is retracted relative to the first piston so that the wedgewise engagement between the pressure receiving surface and the pushing surface can be cancelled. By the unclamping actuating portion of the second piston to be subsequently retracted, the actuated portion of the first piston is retracted, so that the first piston is unclamped.

Since the present invention has the above-mentioned construction and function, the following advantages can be obtained.

Differently from the conventional embodiment, since the present invention doesn't need a stroke for swinging the clamping member to the temporary clamping position by a wedge member, the entire stroke becomes short. Therefore, by shortening the length of the housing in the forward and backward direction, the clamping apparatus can be manufactured small in size. Besides, since the entire stroke of the clamping apparatus is short as mentioned above, also the clamping operation time becomes short to enhance the efficiency of the clamping working.

At the time of clamping, a strong clamping force can be attained by a total effect provided by the wedgewise engaging force and the leverage of the first piston.

Further, even though the fluid pressure within the first actuation chamber is abnormally decreased or vanished, the friction force acts on the fulcrum portion of the first piston and another friction force acts on the outer peripheral surface of the second piston so as to counteract the unclamping force such as the gravitational force and the processing reaction force, so that the resultant force of these two friction forces serves to prevent the retraction of the first piston. Moreover, when the first piston starts to retract even a little, the pressure receiving surface of the first piston bites onto the pushing surface of the second piston which has been frictionally secured, so that the retraction of the first piston can be prevented. Therefore, it becomes possible to prevent certainly a clamping cancellation of the clamping apparatus.

Since an unclamping operation of the first piston is carried out after the wedgewise engagement between the pressure receiving surface and the pushing surface has been cancelled, a force required for that operation can be small. Therefore, the unclamping operation of the clamping apparatus is easy and reliable.

BRIEF DESCRIPTION OF THE DRAWINGS

The above and other objects, advantages and features of the present invention will become apparent when considered with the following detailed description and accompanying drawings, wherein:

FIG. 1 is an explanatory view of an operation of a clamping apparatus, FIG. 1(*a*) shows an unclamping condition, FIG. 1(*b*) shows a temporary clamping condition and FIG. 1(*c*) shows a practical clamping condition.

FIG. 2 is a vertical sectional side view of the clamping apparatus;

FIG. 3 is a view taken along the arrow line III—III in FIG. 2;

FIG. 4 is a view taken along the arrow line IV—IV in FIG. 2;

FIG. 5 is a view taken along the arrow line V—V in FIG. 2;

FIG. 6 is a schematic view for explaining a function of the clamping apparatus;

FIG. 7 is a view corresponding to FIG. 2;

FIG. 8 is a sectional view taken along the arrow line VIII—VIII in FIG. 7;

FIG. 13 is a view corresponding to FIG. 2;

FIG. 14 is a view taken along the arrow line XIV—XIV in FIG. 13; and

FIG. 15 is a sectional view taken along the arrow line XV—XV in FIG. 13.

DESCRIPTION OF THE PREFERRED EMBODIMENTS

First Embodiment

FIG. 1 through FIG. 6 show a first embodiment.

Figure 2:
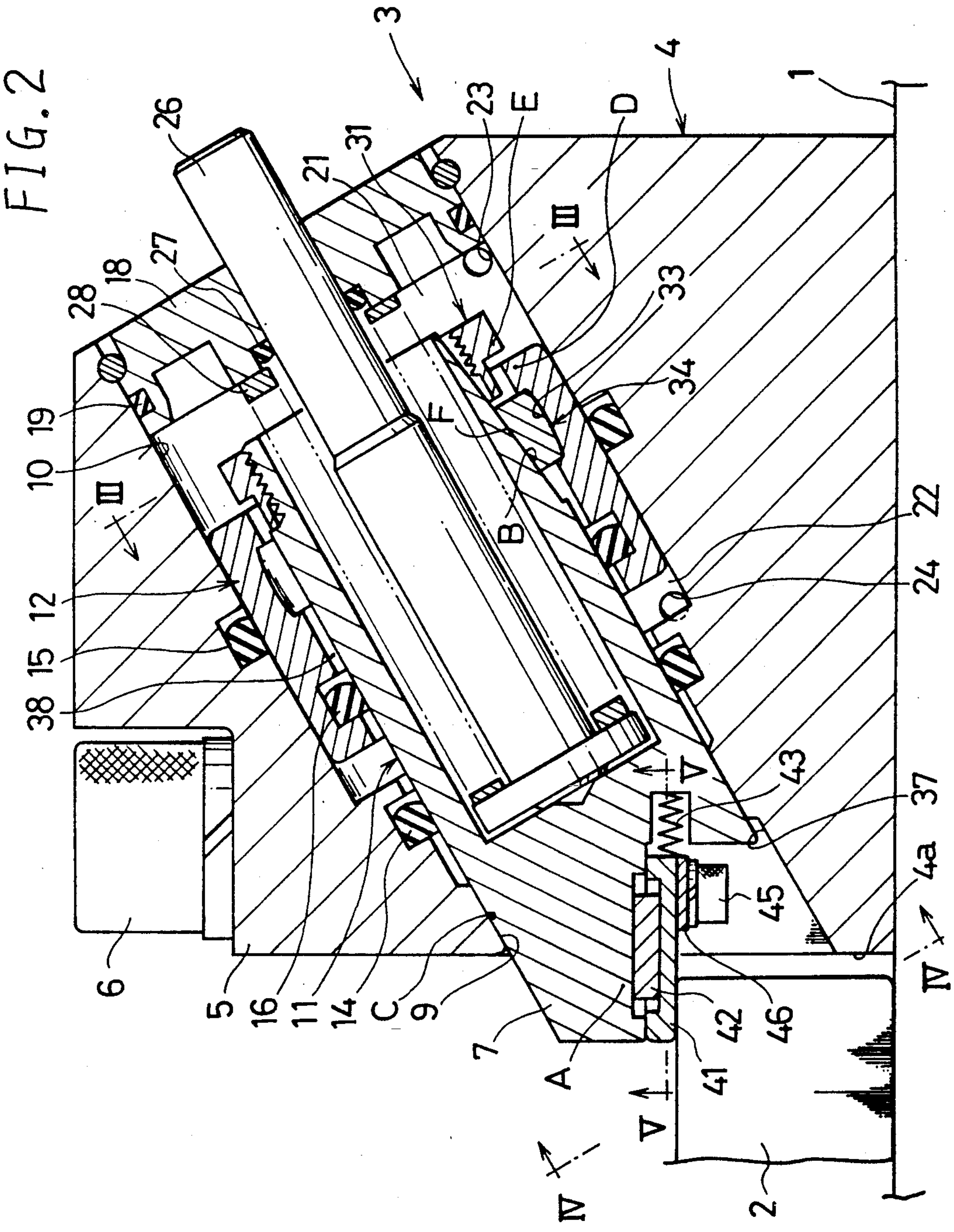

As shown in FIG. 2, a mould 2 is fixedly clamped onto an upper surface of a fixed angular table 1 of an injection moulding machine by means of a pneumatic clamping apparatus 3. This pneumatic clamping apparatus 3 has a pair of left and right side walls 5 of a housing 4 fixedly secured onto the fixed angular table 1 by two bolts 6, and its clamping portion 7 extended forwardly from a front face 4*a* of the housing 4 is adapted to clamp the mould 2 from above slantly.

A first bore 9 of a small diameter is formed in the front portion of the housing 4 with being opened in the housing front face 4*a* in a forwardly declining manner, and a second bore 10 of a large diameter is formed in the rear portion of the housing 4 coaxially with the first bore 9. A cylindrical first piston 11 for temporary clamping is inserted into the first bore 9 through an O-ring 14 so as to be movable in fluid tight relationship. The clamping portion 7 is formed in the front portion of the first piston 11. A cylindrical second piston 12 for practical clamping is inserted into the second bore 10 through an O-ring 15 so as to be movable in fluid tight relationship. The rear portion of the first piston 11 is inserted into the second piston 12 through an O-ring 16 so as to be movable in fluid tight relationship. An end plate 18 is fixed to the rear portion of the second bore 10 through an O-ring 19 in fluid tight relation ship.

A first actuation chamber 21 for clamping is formed behind both the piston 11, 12, and a second actuation chamber 22 for unclamping is formed before the second piston 12. Pressurized air supply/discharge ports 23, 24 are opened in the first chamber 21 and the second chamber 22 respectively. A rod 26 for detecting the clamping and unclamping conditions is passed through the end plate 18 through an O-ring 27 so as to be movable in fluid tight relationship, and the first piston 11 is resiliently urged forwardly through the left end portion of the rod 26 by a clamping condition holding spring 28.

Figure 3:
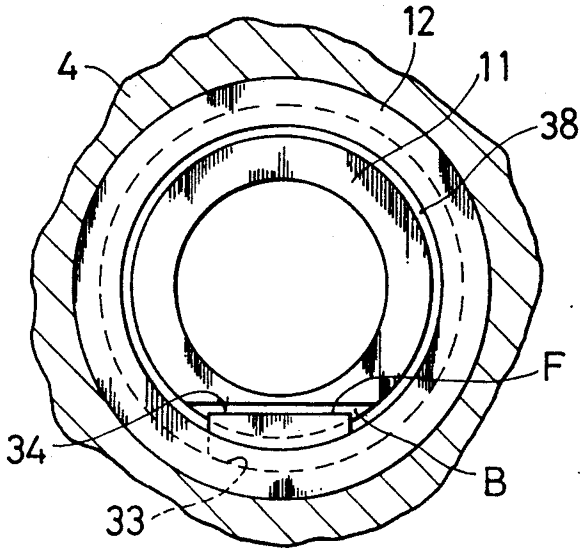

With reference to FIG. 2 and FIG. 3, both the pistons 11, 12 will be explained more in detail. FIG. 3 is a view taken along the arrow line III—III in FIG. 2 and shows such a condition that the rod 26, the spring 28 and a nut 31 to be explained later are dismounted from the first piston 11.

An acting point portion A is provided in a lower portion of the clamping portion 7 of the first piston 11, and a wedge type pressure receiving surface B is provided in a rear lower portion of the first piston 11 in a forwardly declining manner. A fulcrum portion C is provided in a front upper portion of the first piston 11. This fulcrum portion C is supported directly by an upper peripheral surface of the first bore 9. An actuated portion E for unclamping is provided in the nut 31 fixed to the rear portion of the first piston 11, so as to face forwardly.

An annular groove 33 having a spheric surface is formed in the rear portion of the cylindrical bore of the second piston 12. A wedge 34 is fitted onto the lower surface of the spheric surface groove 33. A wedge type pushing surface F is formed in the upper surface of the wedge 34 so as to face the pressure receiving surface B from below. In the rear portion of the second piston 12 there is provided an actuating portion D for unclamping so as to face the actuated portion E from front side.

A first swing gap 37 is provided in the first bore 9 so as to be located below the front portion of the first piston 11. Further, between the rear portion of the first piston 11 and the second piston 12 there is provided an annular second swing gap 38.

Figure 4:
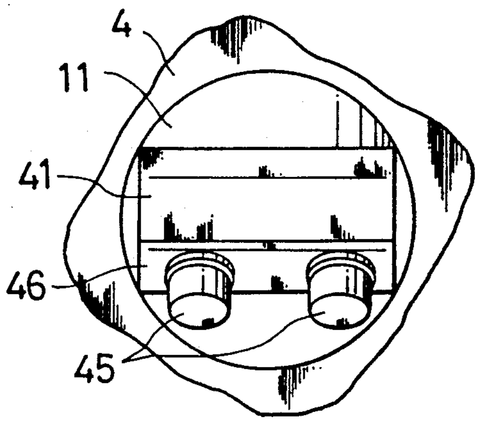
Figure 5:
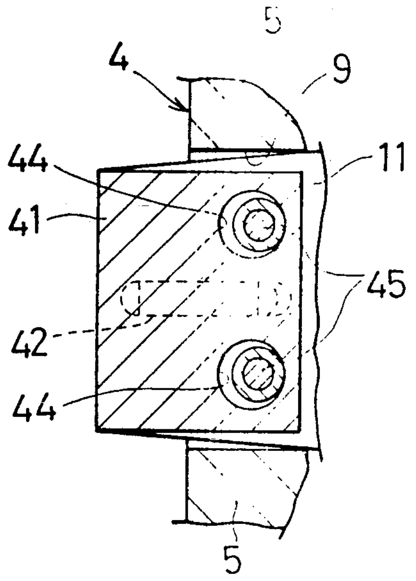

As shown in FIG. 2, FIG. 4 and FIG. 5, a sliding shuttle member 41 is interposed between the upper surface of the mould 2 and the acting point portion A through a key 42 so as to be slidable within a certain range in the forward and backward directions. The shuttle member 41 is made of a nitrided and plated alloy steel and resiliently urged forwardly by an advancement spring 43. A forward movement of the shuttle member 41 is limited to the certain range by a pair of stop bolts 45, 45 put through play holes 44. The symbol 46 designates a support plate.

Figure 1A:
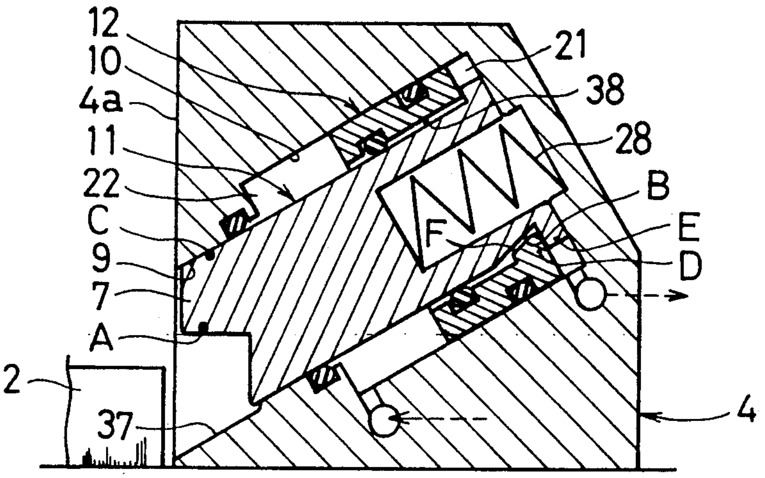
FIG. 1 through FIG. 6 show a first embodiment of the present invention.
Figure 1B:
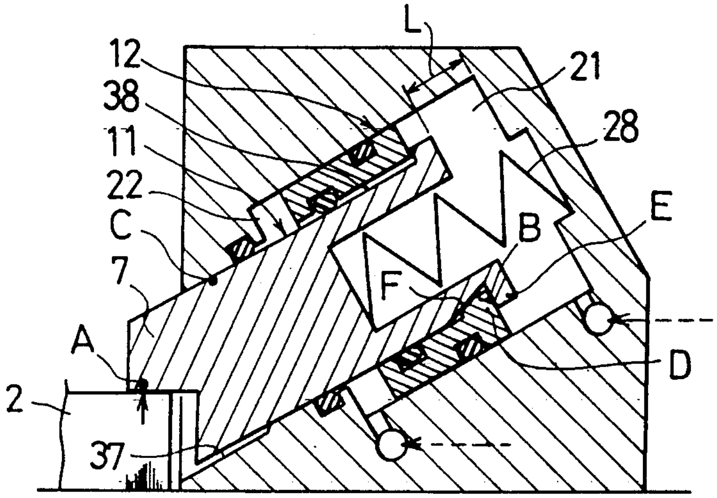
Figure 1C:
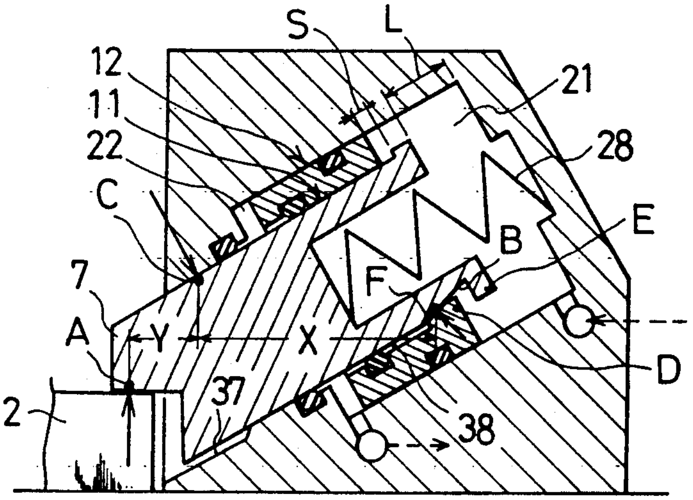
Figure 6:
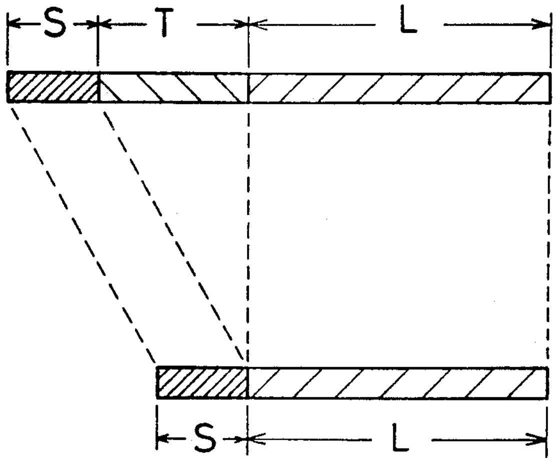

As shown in FIG. 1 and FIG. 6, the pneumatic clamping apparatus 3 operates as follows.

Under the unclamping condition shown in FIG. 1(*a*), the pressurized air within the first chamber 21 is discharged from a first supply/discharge valve (not illustrated) and the pressurized air is supplied to the second chamber 22 from a second supply/discharge valve (not illustrated). Thereupon, the second piston 12 serves to retract the first piston 11 against the spring 28.

When changing over from the unclamping condition to the clamping condition, as shown in FIG. 1(*b*), the pressurized air is supplied also to the first chamber 21 while the supply of pressurized air to the second chamber 22 is maintain. Thereupon, while the second piston 12 is held at the retracted position by the opposite air pressures exerted from both the chambers 21, 22 respectively, the first piston 11 is advanced by the air pressure within the first chamber 21 and the resilient force of the spring 28. Thereby, the first piston 11 advances a distance of an extension stroke L (refer to the lower view of FIG. 6) with actuating and accompanying the second piston 12 through the unclamping actuated portion E and the actuating portion D in order so that the clamping portion 7 can be brought into contact with the mould 2 from above. Thereupon, the mould 2 is strongly temporarily clamped by both the air pressure within the first chamber 21 and the spring 28 so as not to cause a sudden shift. In this case, the acting point portion A has been upwardly swung by a reaction force from the mould 2. Incidentally, since the pressurized air within the second chamber 22 is supplied to the first chamber 21 from the second supply/discharge valve through the first supply/discharge valve accompanying with the advancements of both the pistons 11, 12, a useless discharge of the pressurized air can be prevented enabling to save an energy.

Subsequently, as shown in FIG. 1(*c*), while the supply of pressurized air to the first chamber 21 is maintained, the pressurized air is discharged from the second chamber 22. Thereupon, the second piston 12 advances a distance of a practical clamping stroke S (refer to the lower view in FIG. 6) relative to the first piston 11 whose further advancement is stopped by the mould 2 so that the pushing surface F of the second piston 12 can engage with the pressure receiving surface B of the first piston 11. The pressure receiving surface B is swung upwards a little and the acting point portion A is swung downwards a little, about the fulcrum portion C by a wedgewise engaging force exerted from the pushing surface F to the pressure receiving surface B.

In this case, the force exerted from the pushing surface F to the pressure receiving surface B is increased corresponding to a ratio between an actuated distance X and an acting distance Y, so that a strong clamping force corresponding to its leverage X/Y is transmitted from the acting point portion A to the mould 2 (herein, a clamping reaction force acting from the mould 2 to the acting point portion A is shown).

Incidentally, it is preferable to set a wedge angle of the pushing surface F at the range of 5 ~ 15 degree. For example, when the wedge angle is set at 10 degree, the wedgewise engaging force acting from the pushing surface F to the pressure receiving surface B becomes ab. 2.5 ~ 3 times as strong as a thrust acting from the first actuation chamber 21 to the second piston 12. The leverage X/Y may be set at the value of ab. 2 ~ 3. As a result, the clamping force acting from the acting point portion A to the mould 2 becomes ab. 5 ~ 9 times as strong as a thrust of the second piston 12. Accordingly, it becomes possible to obtain a strong clamping force even though the pressurized air of a low pressure at ab. 7 $kgf/cm^2$ is used as a working fluid.

When the pressure within the first chamber 21 is abnormally decreased or vanished by a damage and the like of a pressurized air delivery pipe, an unclamping force such as a gravitational force, a processing reaction force and the like acting on the mould 2 is apt to cancel the clamping condition of the first piston 11. However, a friction force acts from the first bore 9 of the housing 4 to the fulcrum portion C of the first piston 11 and another friction force acts from the second bore 10 to the outer peripheral surface of the second piston 12 so as to counteract that unclamping force, so that a resultant force of those two friction forces serves to prevent a retraction of the first piston 11. Moreover, when the first piston 11 starts to retract even a little, the pressure receiving surface B of the first piston 11 bites onto the pushing surface F of the second piston 12 which has been frictionally secured, so that the retraction of the first piston 11 can be prevented.

Incidentally, though the first bore 9 is formed in a straight configuration, a convex portion for supporting a swinging movement is formed naturally on the upper and lower surfaces of the first bore 9 by the swinging of the first piston 11 at the time of clamping operation as mentioned above. Therefore, it is not necessary to form a support portion for the fulcrum portion C in the first bore 9.

To the contrary, when changing over the pneumatic clamping apparatus 3 from the practical clamping condition shown in FIG. 1(*c*) to the unclamping condition shown in FIG. 1(*a*), the pressurized air within the first chamber 21 is discharged and the pressurized air is supplied to the second chamber 22. Thereupon, firstly the second piston 12 is retracted by the air pressure so that the wedgewise engagement between the pressure receiving surface B and the pushing surface F can be cancelled. Then, as shown in FIG. 1(*b*), the unclamping actuating portion D is brought into contact with the actuated portion E. Subsequently as shown in FIG. 1(*a*), the first piston 11 is retracted by the second piston 12 against the spring 28.

In that way, since the first piston 11 is actuated for unclamping after the wedgewise engagement between the pressure receiving surface B and the pushing surface F has been cancelled, the actuation force can be small. Therefore, the unclamping operation of the clamping apparatus 3 is easy and reliable.

The shuttle member 41 shown in FIG. 2 operates as follows at the time of unclamping operation. When the first piston 11 is so actuated as to retract backwardly acclivously, firstly a slide is caused between the shuttle member 41 frictionally secured to the mould 2 and the acting point portion A so that only the clamping portion 7 can be actuated backwardly acclivously leaving the shuttle member 41 behind. By the first piston 11 to be retracted subsequently, the clamping portion 7 and the shuttle member 41 are actuated backwardly acclivously so that the mould 2 can be unclamped. Therefore, even when the shuttle member 41 bites on the mould 2 strongly at the time of clamping, the unclamping operation can be carried out reliably by the slide caused between the shuttle member 41 and the acting point portion A at the time of unclamping.

The pneumatic clamping apparatus 3 having the above-mentioned construction can provide the following advantages.

As shown in the lower view of FIG. 6, at the time of clamping both the pistons 11, 12 advance a distance of the extension stroke L so that the first piston 11 is brought into contact with the mould 2. After that, only the second piston 12 further advances a distance of the practical clamping stroke S to complete the clamping operation. Therefore, it is possible to omit a stroke T for moving the clamping member to the temporary clamping position by the wedge member (refer to the upper view in FIG. 6), so that the entire stroke becomes decreased. As a result, the length of the housing 4 in the forward and backward direction becomes short and the clamping apparatus 3 can be manufactured small in size.

Moreover, since the entire stroke of the clamping apparatus 3 can be short, also the clamping operation time becomes short to enhance an efficiency of the clamping working.

Since the first piston 11 and the second piston 12 are provided within the housing 4 substantially coaxially, a height of the housing 4 can be lowered. Since the first piston 11 is accommodated within the second piston 12, the length of the housing 4 in the forward and backward direction can be made short. Accordingly, the clamping apparatus 3 can be manufactured smaller in size.

Since the first bore 9 into which the first piston 11 is inserted is opened in the front face 4*a* of the housing 4 in the forwardly declining manner, it becomes possible to clamp the mould 2 from above and an allowable range of a thickness of the mould 2 to be clamped is large. Further, since it is enough to form the straight first bore 9 in the housing 4, it is not necessary to previously provide the support portion for the fulcrum portion C in the housing 4 or to attach the support member comprising a separate component thereto, so that a manufacturing cost of the clamping apparatus 3 can be reduced.

Since in addition to the pneumatic thrusts of both the pistons 11, 12, the resilient force of the spring 28 can be utilized as the clamping force of the pneumatic clamping apparatus 3, its clamping capability is large.

Since the wedge 34 is provided separately from the second piston 12 so that a material and a surface treatment of the wedge 34 can be selected at a large option, it becomes easy to design such a clamping apparatus adapted to various kinds of applications.

The first embodiment may be modified as follows.

When changing over from the unclamping condition to the clamping condition, the pressurized air may be supplied to the first chamber 21 and at the same time the pressurized air may be discharged from the second chamber 22 instead of the provision of such a procedure as to supply the pressurized air to both the chambers 21, 22 simultaneously as mentioned above. In this case, in order to attain such a condition that the second piston 12 has been retracted from the first piston 11 at the time of temporary clamping, it is preferable to slow a discharging speed of the pressurized air from the second chamber 22 by connecting a throttle valve to the supply/discharge port 24 of the second chamber 22. But, this throttle valve is not essential.

The aforementioned clamping condition holding spring 28 may be omitted. In this case, at the time of temporary clamping the first piston 11 may be advanced only by the air pressure within the first chamber 21.

By selecting suitable materials and suitable surface treatments for the mould 2 and the clamping portion 7, the aforementioned shuttle member 41 may be omitted. Further, in order to seal both the pistons 11, 12, a X-ring or a U-packing may be used instead of the O-rings 14, 15, 16.

The first swing gap 37 may be provided by decreasing the diameter of the first piston 11 instead of forming it in the first bore 9 of the housing 4. Also the second swing gap 38 may be provided by decreasing the diameter of the first piston 11 instead of forming it in the second piston 12. The aforementioned first bore 9 may be provided previously in its upper and lower surfaces with a convex portion for swinging support respectively instead of the straight configuration.

FIG. 7 and FIG. 8, FIG. 9 through FIG. 12 and FIG. 13 through FIG. 15 show a second embodiment through a seventh embodiment respectively. Incidentally, in these embodiments component parts having the same constructions as those of the above-metioned first embodiment are designated by the same symbols in principle.

Second Embodiment

Figure 7:
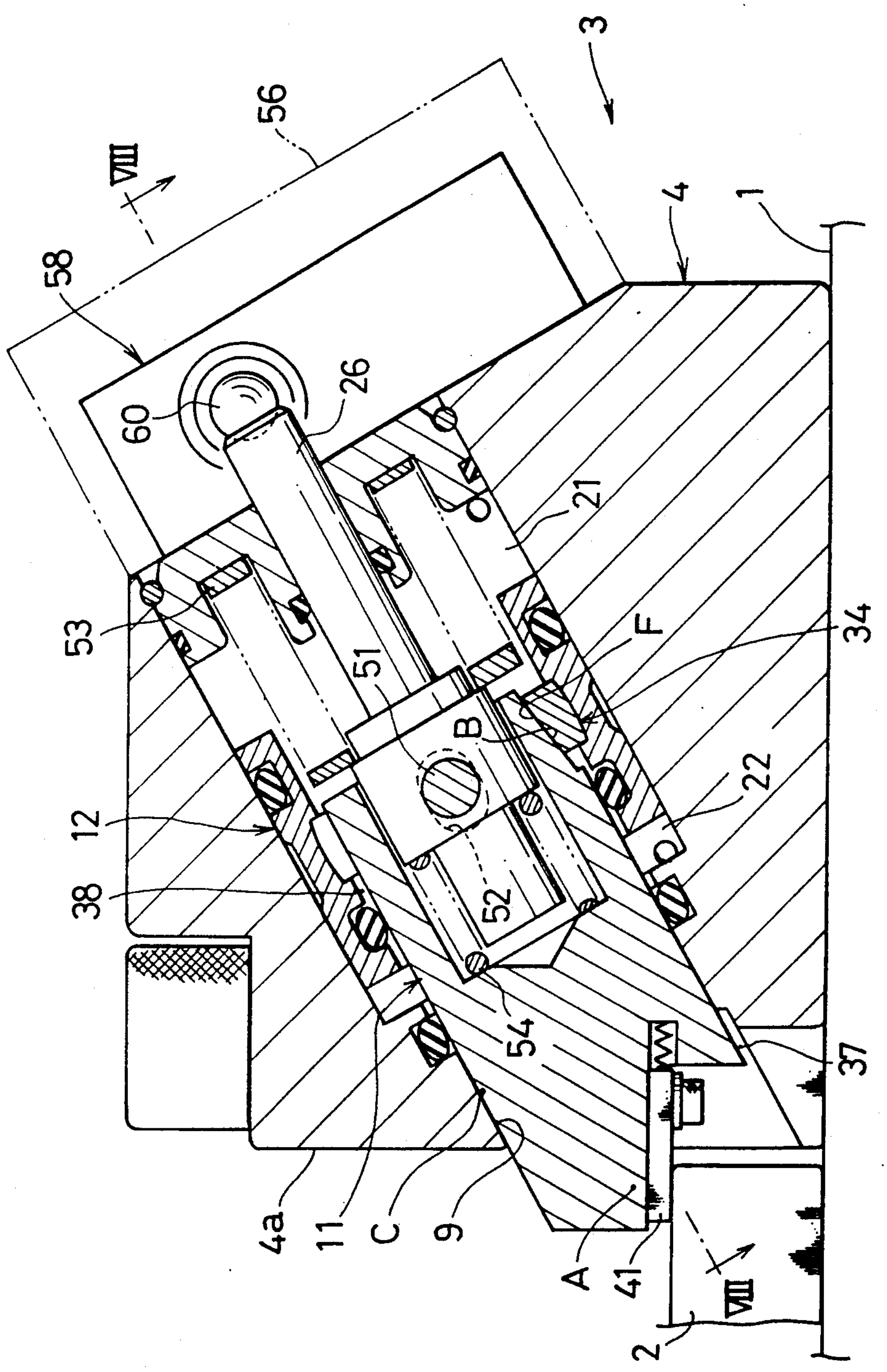
FIG. 7 and FIG. 8 show a second embodiment of the present invention.
Figure 8:
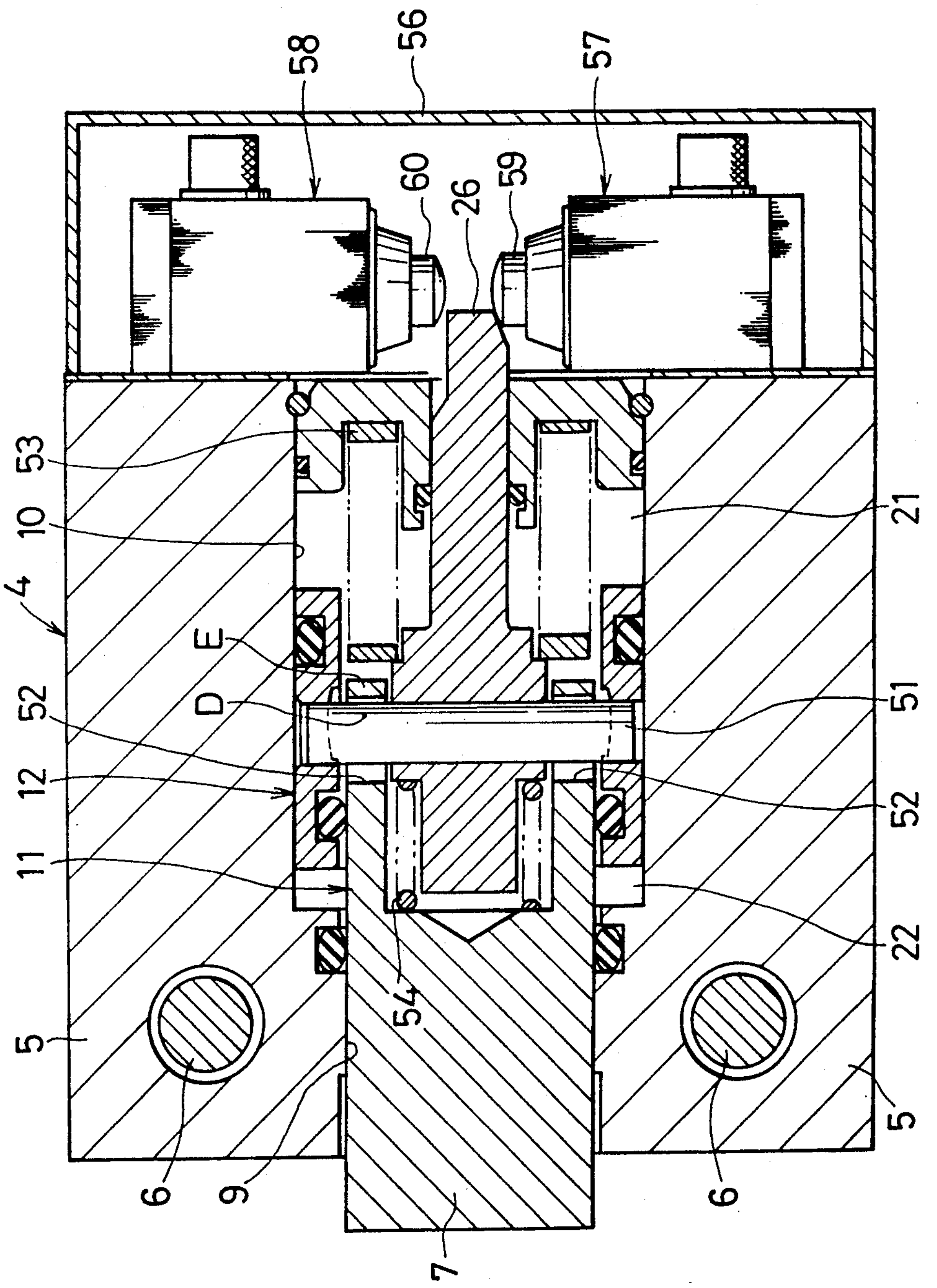

FIG. 7 and FIG. 8 show a second embodiment. The clamping/unclamping condition detection rod 26 and the second piston 12 are connected by a transverse connection pin 51, and a pair of elongated holes 52, 52 are formed in the rear portion of the first piston 11. The pin 51 is put through those elongated holes 52, 52 so as to be movable in the forward and backward directions. The unclamping actuating portion D is formed by the opposite end portions of the pin 51 and the unclamping actuated portion E is formed by the rear wall of the elongated hole 52. The rod 26 is resiliently urged forwardly by a first spring 53 and the first piston 11 is resiliently urged forwardly by a second spring 54 relative to the rod 26.

Within a switch box 56 fixedly secured to the rear surface of the housing 4 there are provided a clamping condition detecting limit switch 57 and an unclamping condition detecting limit switch 58. Each contactor 59, 60 of these limit switches 57, 58 is adapted to be actuated by the rear portion of the rod 26.

In this second embodiment, a cancellation of the clamping condition can be strongly prevented by resiliently urging the pushing surface F of the wedge 34 forwardly by the first spring 53 through the rod 26, the pin 51 and the second piston 12 in order. Further, it is possible to increase the clamping force by both the springs 53, 54. However, one or both of these springs 53, 54. However, one or both of these springs 53, 54 may be omitted, too.

Third Embodiment

Figure 9:
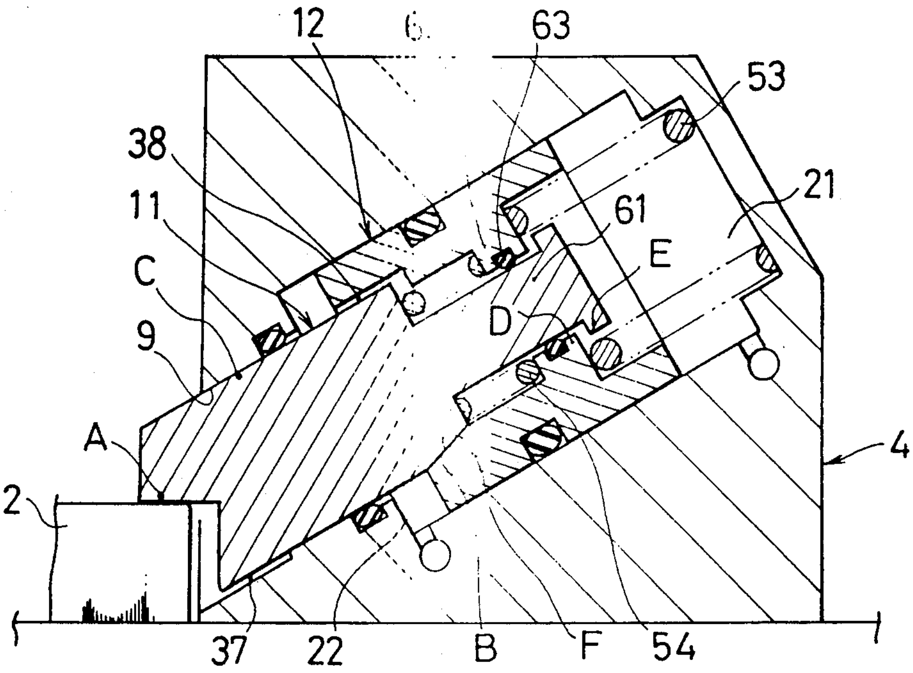
FIG. 9 shows a third embodiment of the present invention and is a view corresponding to FIG. 2.

FIG. 9 shows a third embodiment.

A reduced-diameter portion 61 formed in the rear portion of the first piston 11 is inserted into a small diameter portion 62 of the second piston 12 through an O-ring 63 in fluid tight relationship. The unclampign actuated portion E is provided in the rear end of the first piston reduced-diameter portion 61, and the actuating portion D is provided in the second piston small diameter portion 62. The pressure receiving surface B is provided in the midway portion of the first piston 11 in the forward and backward direction. The pushing surface F is provided in the front lower portion of the second piston 12. The rod 26 employed in the respective above-mentioned embodiments is omitted. The second piston 12 is directly resiliently urged by the first spring 53, and the first piston 11 is resiliently urged by the second spring 54 relative to the second piston 12.

Fourth Embodiment

Figure 10:
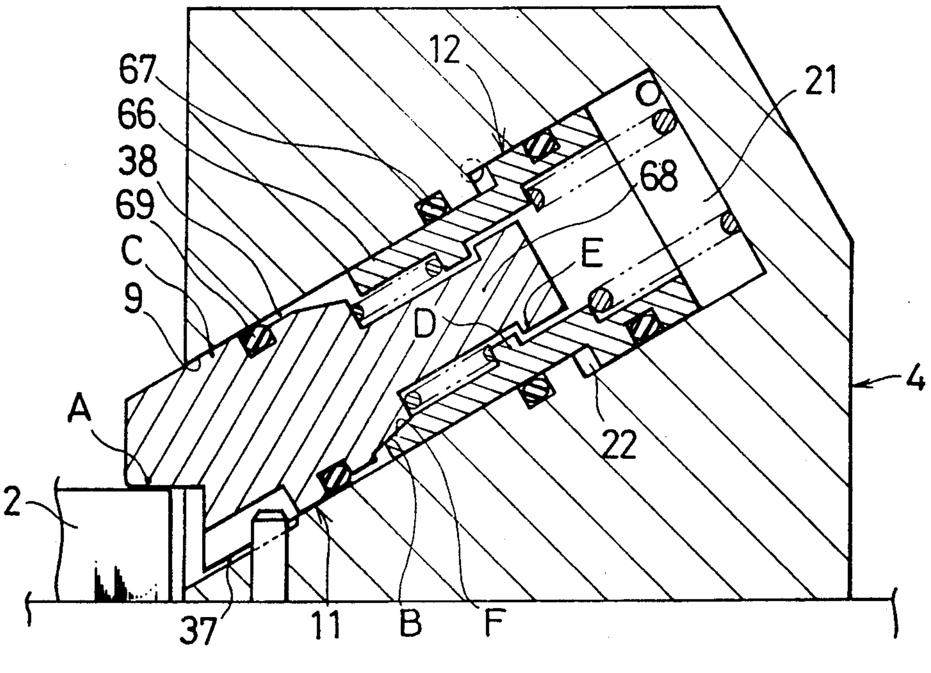
FIG. 10 shows a fourth embodiment thereof and is a view corresponding to FIG. 2.

FIG. 10 shows a fourth embodiment, which is provided by modifying the embodiment shown in FIG. 9 as follows.

A piston rod 66 projected forwardly from the second piston 12 is inserted into the first bore 9 of the housing 4 through an O-ring 67 in fluid tight relationship. A pressure within the first actuation chamber 21 is adapted to act on the rear surface of an O-ring 69 for the first piston 11 through a gap between the piston rod 66 a first pinton reduced-diameter portion 68.

Fifth Embodiment

Figure 11:
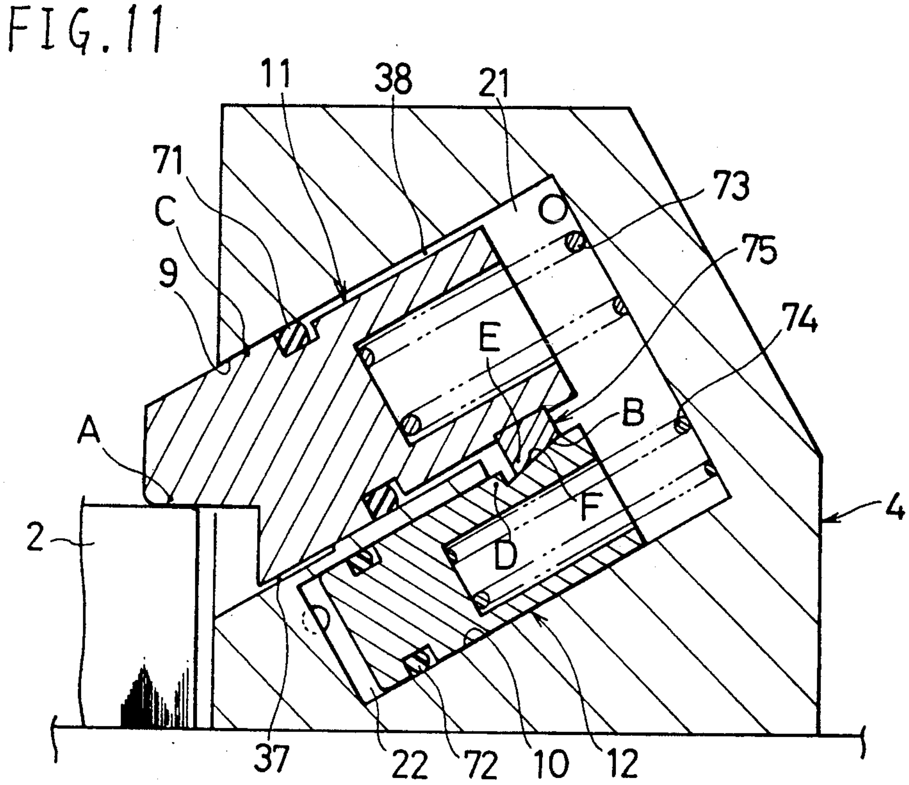
FIG. 11 shows a fifth embodiment thereof and is a view corresponding to FIG. 2.

FIG. 11 shows a fifth embodiment.

The first bore 9 and the second bore 10 are formed in the housing 4 in vertically spaced apart relationship. The first piston 11 is inserted into the first bore 9 through an O-ring 71 in fluid tight relationship, and the second piston 12 is inserted into the second bore 10 through an O-ring 72 in fluid tight relationship. The first actuation chamber 21 having a large diameter is formed behind both those pistons 11, 12, and the second actuation chamber 22 having a small diameter is formed before the second piston 12. Each pistons 11, 12 is resiliently urged forwardly by a first spring 73 and a second spring 74 respectively. The unclamping actuated portion E and the pressure receiving surface B are provided in the front and the rear portions of a wedge 75 fixedly secured to the rear lower portion of the first piston 11, and the unclamping acutating portion D and the pushing surface F are provided in the front and the rear portions of the rear upper section of the second piston 12 respectively.

Sixth Embodiment

Figure 12:
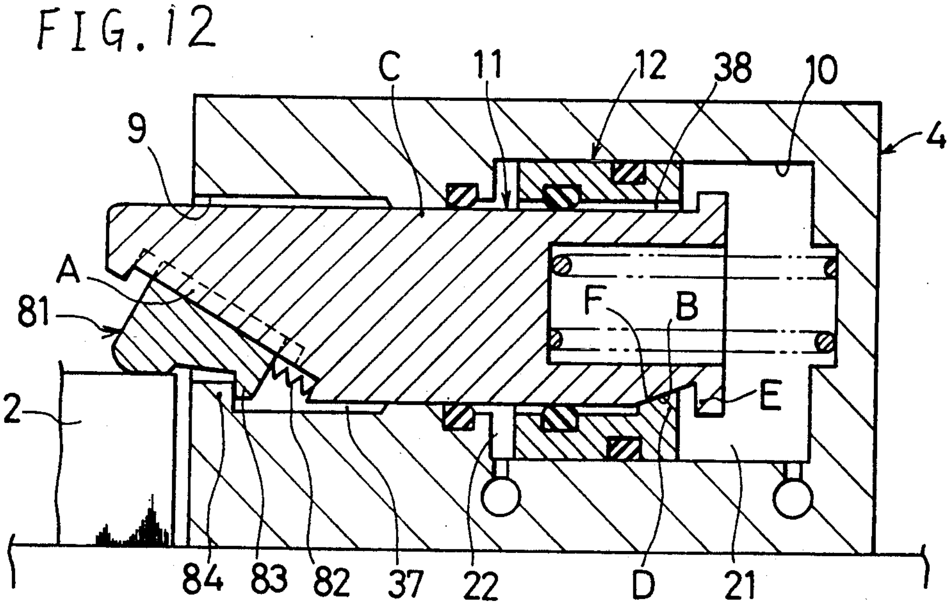
FIG. 12 shows a sixth embodiment thereof and is a view corresponding to FIG. 2.

FIG. 12 shows a sixth embodiment.

The first bore 9 and the second bore 10 are arranged horizontally and coaxially, and a clamping member 81 is provided between the acting point portion A formed in the front portion of the first piston 11 and the mould 2.

Under the unclamping condition, the clamping member 81 is adapted to be advanced forwardly acclivously by an advancement spring 82 relative to the first piston 11. When both the pistons 11, 12 are advanced for clamping, the clamping member 81 is stopped at its lower portion by a stopper wall 84, so that the clamping member 81 is swung downwardly by the acting point portion A of the first piston 11 to be brought into contact with the mould 2. Then, by the wedgewise engaging force acting from the pushing surface F of the second piston 12 to the pressure receiving surface B of the first piston 11, the pressure receiving surface B is swung upwardly about the fulcrum portion C, so that the acting point portion A actuates the clamping member 81 downwardly for clamping.

Accordingly, a swinging of the clamping member 81 from the extension position to the temporary clamping position is carried out by the thrust of the first piston 11, and a swinging of the clamping member 81 from the temporary clamping position to the practical clamping position is carried out by the thrust of the second piston 12.

Seventh Embodiment

Figure 13:
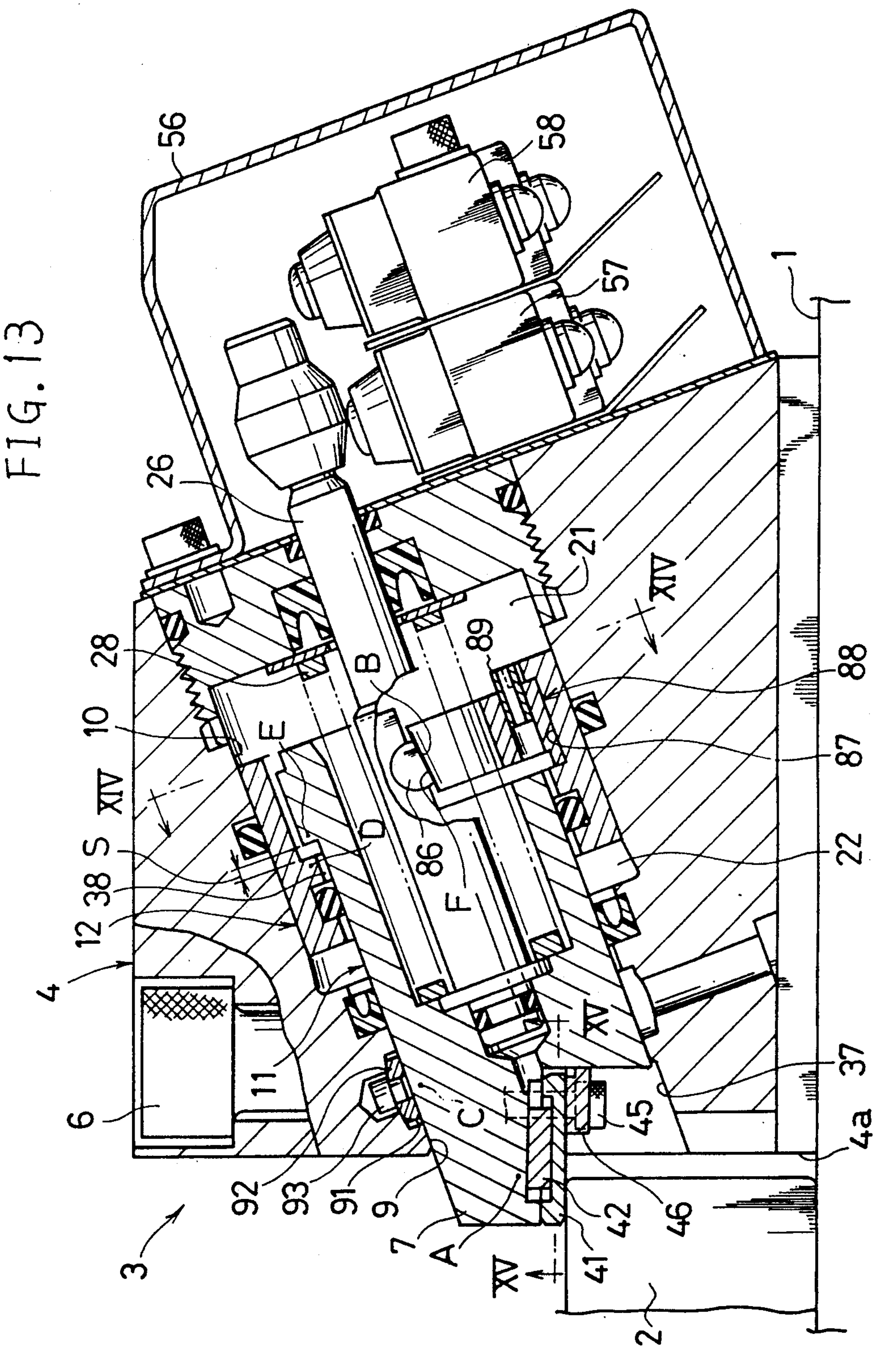
FIG. 13 through FIG. 15 show a seventh embodiment thereof.
Figure 14:
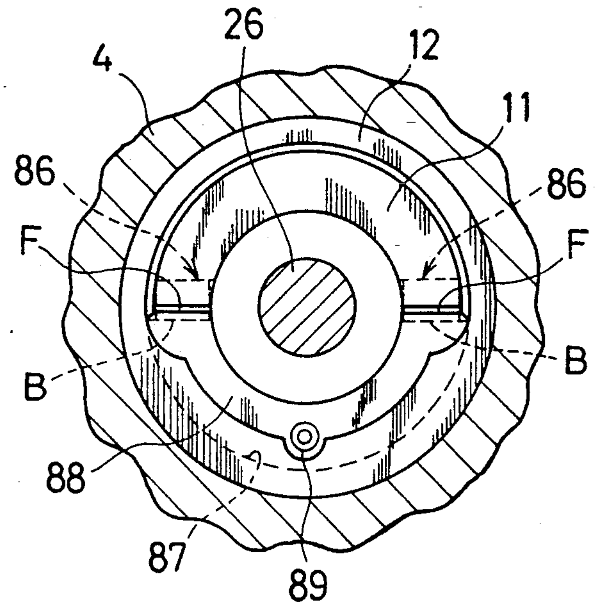
Figure 15:
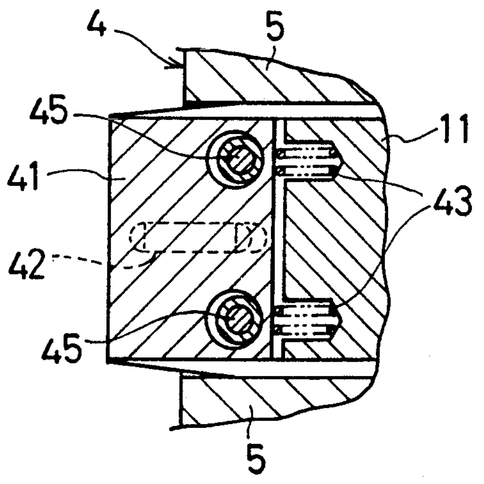

FIG. 13 through FIG. 15 show a seventh embodiment. This seventh embodiment is provided by modifying the above-mentioned first embodiment (refer to FIG. 1 through FIG. 6) as follows.

A pair of pressure receiving pins 86, 86 are pivotally supporting by the left and the right of the rear portion of the fist piston 11 respectively, and the pressure receiving surface B is formed in the lower surface of each pin 86. The two pressure receiving surfaces B, B are arranged substantially coaxially with the second piston 12 and the clamping condition detecting rod 26. A supporting groove 87 is formed in the rear portion of the inner peripheral surface of the second piston 12. A revolution of a half-ring shaped wedge member 88 put into the supporting groove 87 is restrained by a stop pin 89. A pair of pushing surfaces F, F are formed in the left and the right upper surfaces of the wedge members 88.

The unclamping actuating portion D is provided in a midway portion of the second piston 12 in the forward and backward direction, and the unclamping actuated portion E is provided in the rear portion of the first piston 11.

A groove 91 having a spheric surface is formed in the front portion of the first bore 9 of the housing 4, and a supporting member 92 having a spheric outer surface is supported by a pin 93 so as to be accommodated within the upper portion of the groove 91. The fulcrum portion C of the first piston 11 is supported by the inner peripheral surface of the supporting member 92.

Incidentally, two limit switches 57, 58 for detecting the clamping condition and the unclamping condition are arranged side-by-side within the front and the rear portions of the switch box 56 respectively.

The following advantages can be provided by this embodiment.

At the time of practical clamping actuation, since the fluid pressure exerted onto the second piston 12 by the pressurized air within the first actuation chamber 21 acts on a portion adjacent to the axis of the first piston 11 through the wedge member 88, a transmission efficiency of ab. 100% can be attained so that the clamping force becomes large. Further, since the pressure receiving surface B are provided in both the left and the right portions of the first piston 11 with facing downwardly, a thickness of the annular portion of the first piston 11 doesn't becomes thin. Therefore, a strong spring having a larger diameter can be employed as the clamping condition holding spring 28, so that the clamping force becomes larger corresponding thereto.

Since the revolution of the first piston 11 about the axis can be prevented by the pair of left and right pushing surfaces F, F, a revolution shift of the first piston 11 is small.

Since the pressure receiving pin 86 can be manufactured from a round rod, its manufacturing is easy. Further, since the pressure receiving pin 86 is supported pivotally by the first piston 11 so as to have a self-alignment function, it is possible to readily correct an angular shift caused when the first piston 11 swings for clamping and also to prevent a wobbling of a wedgewise engagement and/or an eccentric wearing. Furthermore, since the pressure receiving pin 86 has the self-alignment function, it is enough to change an angle of the pushing surface F of the wedge member 88 when changing an angle of the wedgewise engagement. Therefore, some of component parts can be utilized in common different kinds of apparatuses.

Since the half-ring shaped wedge member 88 has a large outer peripheral area, a surface pressure generated therein at the time of clamping is small. Therefore, a durability of the clamping apparatus is improved.

Incidentally, in the respective above-mentioned embodiments, a working fluid of the clamping apparatus may be a gas such as a nitrogen gas or a liquid such as an oil and a water instead of the pressurized air. When a high pressurized oil is imployed as the working fluid, a strong clamping force can be attained by a total effect comprising a force-increasing effect of the wedge and a leverage force-increasing effect of the first piston and the hydraulic clamping apparatus can be manufactured small in size Many different embodiments of the present invention will be obvious to those skilled in the art, some of which have been disclosed or referred to herein, hence it is to be understood that the specific embodiments of the present invention as presented herein are intended to be by way of illustration only and are not limiting on the invention, and it is to be further understood that such embodiments, changes, or modifications may be made without departing from the spirit and scope of the present invention as set forth in the claims appended hereto.

What is claimed is:

1. A clamping apparatus comprising:

a housing (4) having a first end and a second end;

a first piston (11) for temporary clamping and a second piston (12) for practical clamping which are arranged within said housing (4) so as to be movable in the direction of said opposite ends in a fluid tight relationship;

a first actuation chamber (21) formed between the second end of said housing (4) and both said piston (11) (12);

a second actuation chamber (22) formed between the first end of said housing (4) and said second piston (12);

an acting point portion (A) provided in the first end portion of said first piston (11);

a wedge type pressure receiving surface (B) and an unclamping actuated portion (E) which are provided in the second end portion of said first piston (11);

a fulcrum portion (C) provided in a midway portion of said first piston (11) in the direction of said opposite ends;

a wedge type pushing surface (F) provided in said second piston (12) so as to face said wedge type pressure receiving surface (B) from below;

an unclamping actuating portion (D) provided in said second piston (12) so as to face said actuated portion (E) from the first end side;

a first swing gap (37) provided in a space below the first end portion of said first piston (11); and a second swing gap (38) provided in a space above the second end portion of said first piston (11);

wherein by a fluid pressure within said first actuation chamber (21), both said pistons (11) (12) are advanced toward said first end side and after that said second piston (12) is advanced toward said first end side relative to the advanced first piston (11), to the contrary by a fluid pressure within said second actuation chamber (22), said first piston (11) is retracted to the second end side through said second piston (12).

2. A clamping apparatus as set forth in claim 1, wherein said first piston (11) and said second piston (12) are arranged substantially coaxially within said housing (4).

3. A clamping apparatus as set forth in claim 2, wherein said first piston (11) is inserted into said second piston (12).

4. A clamping appartus as set forth in claim 1, wherein a first bore (9) for a first piston insertion is formed in said housing (4) in succh a manner as declining toward the first end side.

5. A clamping apparatus as set in claim 1, wherein a first bore (9) for a first piston insertion is formed straight in said housing (4), and a supporting portion for directly supporting said fulcrum portion (C) is formed in the upper peripheral surface of said first bore (9).

6. A clamping apparatus as set forth in claim 1, wherein a supporting member (92) is interposed between said fulcrum portion (C) and said housing (4), and said supporting member (92) is supported vertically swingably by said housing (4).

* * * * *